US010303567B2

(12) United States Patent
Finnerty et al.

(10) Patent No.: US 10,303,567 B2
(45) Date of Patent: May 28, 2019

(54) MANAGING DATABASE NODES

(71) Applicant: ENTIT Software LLC, Sunnyvale, CA (US)

(72) Inventors: James L. Finnerty, Concord, MA (US); Jaimin M. Dave, Burlington, MA (US); Stephen G. Walkauskas, Pittsburgh, PA (US)

(73) Assignee: ENTIT SOFTWARE LLC, Sunnyvale, CA (US)

(*) Notice: Subject to any disclaimer, the term of this patent is extended or adjusted under 35 U.S.C. 154(b) by 109 days.

(21) Appl. No.: 13/968,278

(22) Filed: Aug. 15, 2013

(65) Prior Publication Data
US 2015/0052383 A1 Feb. 19, 2015

(51) Int. Cl.
G06F 11/00 (2006.01)
G06F 11/20 (2006.01)
G06F 11/14 (2006.01)

(52) U.S. Cl.
CPC ...... *G06F 11/2025* (2013.01); *G06F 11/1461* (2013.01); *G06F 11/2035* (2013.01); *G06F 11/2048* (2013.01)

(58) Field of Classification Search
CPC ....... H04L 12/437; H04L 45/28; H04L 41/12; H04L 45/02; H04B 10/275; H04B 10/0771; G06F 11/2028
See application file for complete search history.

(56) References Cited

U.S. PATENT DOCUMENTS

| 5,555,404 | A | 9/1996 | Torbjornsen et al. |
| 6,442,694 | B1* | 8/2002 | Bergman ............ H04L 41/0654 709/224 |
| 6,944,785 | B2 | 9/2005 | Gadir et al. |
| 6,973,023 | B1* | 12/2005 | Saleh ...................... H04L 12/66 370/217 |
| 7,984,043 | B1* | 7/2011 | Waas ................ G06F 17/30932 707/718 |
| 8,108,382 | B1* | 1/2012 | Brown .............. G06F 17/30463 707/715 |
| 8,126,849 | B2* | 2/2012 | Schwan .............. G06F 11/2094 707/655 |
| 8,315,172 | B2 | 11/2012 | Baglin et al. |
| 8,327,186 | B2 | 12/2012 | Coatney et al. |

(Continued)

FOREIGN PATENT DOCUMENTS

| CN | 102810113 A | 12/2012 |
| GN | 101072160 A | 11/2007 |

OTHER PUBLICATIONS

Peng; "The Vertica Database Forums"; May 23, 2013; 2 pages.
(Continued)

*Primary Examiner* — Loan L. T. Truong

(57) ABSTRACT

A method for managing database nodes includes determining that a data segment is on a failed node. The data segment is referenced by an operation of a query plan. The method includes selecting a victim node based on a segmentation ring, a buddy node for the data segment, a plurality of remaining operational nodes, and a predetermined selection parameter. The method includes generating a query plan such that the victim node performs double duty for operations accessing the data segment from a buddy projection on the victim node, and operations accessing a data segment for a primary projection of the victim node.

20 Claims, 6 Drawing Sheets

(56) References Cited

U.S. PATENT DOCUMENTS

| | | | |
|---|---|---|---|
| 8,745,036 B2* | 6/2014 | Burger | G06F 16/24542 707/718 |
| 9,137,098 B2* | 9/2015 | Chen | H04L 41/145 |
| 9,495,260 B2* | 11/2016 | Knight | G06F 11/203 |
| 2003/0028509 A1* | 2/2003 | Sah | G06F 17/30595 |
| 2004/0095946 A1* | 5/2004 | Baker | H04L 12/44 370/405 |
| 2004/0199486 A1 | 10/2004 | Gopinath et al. | |
| 2004/0260652 A1* | 12/2004 | Rose | G06Q 20/0855 705/51 |
| 2005/0289098 A1* | 12/2005 | Barsness | G06F 17/30445 |
| 2006/0136396 A1* | 6/2006 | Brobst | G06F 17/30463 |
| 2006/0155912 A1* | 7/2006 | Singh | G06F 9/5088 711/6 |
| 2006/0215544 A1* | 9/2006 | Asa | H04L 12/42 370/216 |
| 2007/0156869 A1* | 7/2007 | Galchev | G06F 9/505 709/223 |
| 2008/0118244 A1* | 5/2008 | Nakada | H04L 12/66 398/59 |
| 2008/0159300 A1* | 7/2008 | Ban | H04L 12/437 370/400 |
| 2009/0040946 A1* | 2/2009 | Archer | H04L 12/42 370/255 |
| 2010/0094981 A1* | 4/2010 | Cordray | G06F 15/177 709/222 |
| 2010/0191720 A1* | 7/2010 | Al-Omari | G06F 16/24542 707/718 |
| 2010/0198806 A1* | 8/2010 | Graefe | G06F 16/24542 707/713 |
| 2010/0246385 A1* | 9/2010 | Balasumbramanian | G05B 19/0423 370/222 |
| 2011/0029687 A1* | 2/2011 | Kirrmann | H04L 12/437 709/236 |
| 2011/0228668 A1* | 9/2011 | Pillai | G06F 11/2023 370/217 |
| 2011/0317549 A1* | 12/2011 | Santos | H04L 12/437 370/225 |
| 2012/0185462 A1* | 7/2012 | Albrecht | G06F 11/3409 707/718 |
| 2012/0233496 A1* | 9/2012 | Gil | G06F 11/2025 714/4.11 |
| 2012/0275785 A1* | 11/2012 | Dasamaneni | H04L 12/437 398/45 |
| 2012/0290692 A1* | 11/2012 | Reich | H04L 12/437 709/220 |
| 2013/0039170 A1* | 2/2013 | Higgins | H04L 12/437 370/228 |
| 2013/0111049 A1* | 5/2013 | Abu-Amara | H04L 61/1511 709/230 |
| 2013/0177021 A1* | 7/2013 | Kitayama | H04L 12/423 370/392 |
| 2013/0223206 A1* | 8/2013 | Dake | H04L 12/437 370/227 |
| 2014/0089294 A1* | 3/2014 | Shankar | G06F 17/30463 707/718 |
| 2014/0310258 A1* | 10/2014 | Tian | G06F 17/30445 707/718 |
| 2014/0310259 A1* | 10/2014 | Tian | G06F 17/30545 707/718 |
| 2016/0232206 A1* | 8/2016 | Hayamizu | G06F 16/2455 |

OTHER PUBLICATIONS

International Search Report & Written Opinion received in PCT Application No. PCT/US2014/051192, dated Nov. 28, 2014, 9 pages.

Li, Z. et al., "rSearch: Ring-based Semantic Overlay for Efficient Recall-guaranteed Search in P2P Networks," Parallel Processing Workshops (ICPPW), 2010 39th International Conference on, IEEE, Sep. 13, 2010, pp. 354-361.

Wirtz, H. et al., "Mesh-DHT: A Locality-Based Distributed Look-Up Structure for Wireless Mesh Networks," Communications (ICC), 2012 IEEE International Conference on, IEEE, 2012, pp. 653-658.

* cited by examiner

500

MANAGING DATABASE NODES

BACKGROUND

In a concurrent execution environment, on a massively parallel processing system, database queries are processed. In such an environment, multiple database nodes host multiple tables of multiple databases, and so on. A projection is the physical storage for all of the data of a database table. The projection includes multiple segments distributed over multiple nodes. A segment is a partition of data, typically specified by column values in the tables.

Typically a node stores data segments of both a primary projection, and a buddy projection for fault tolerance. In this way, if a node fails, a replica of the data segment on the down node is available from another node in the cluster, a buddy node that is a backup. As such, when all nodes are up, query execution can use all available resources. Additionally, when one or more nodes are down, one or more nodes might do double-duty servicing its own requests, and the requests for the failed node. Eventually, the buddy node may become a victim node if it runs out of memory, or other resources, because the node is performing double duty. In one example environment, expected throughput falls by approximately a factor of N, where N is the total number of queries running concurrently.

BRIEF DESCRIPTION OF THE DRAWINGS

Certain examples are described in the following detailed description and in reference to the drawings, in which.

DETAILED DESCRIPTION

A database query is typically expressed in a structured query language, such as SQL. SQL is a programming language for managing data in a relational database management system (RDBMS). SQL includes a data definition language and a data manipulation language. The scope of SQL includes data insert, query, update and delete, schema creation and modification, and data access control. Queries specify tables, columns to access, and a predicate for selecting rows in the tables.

Figure 1:
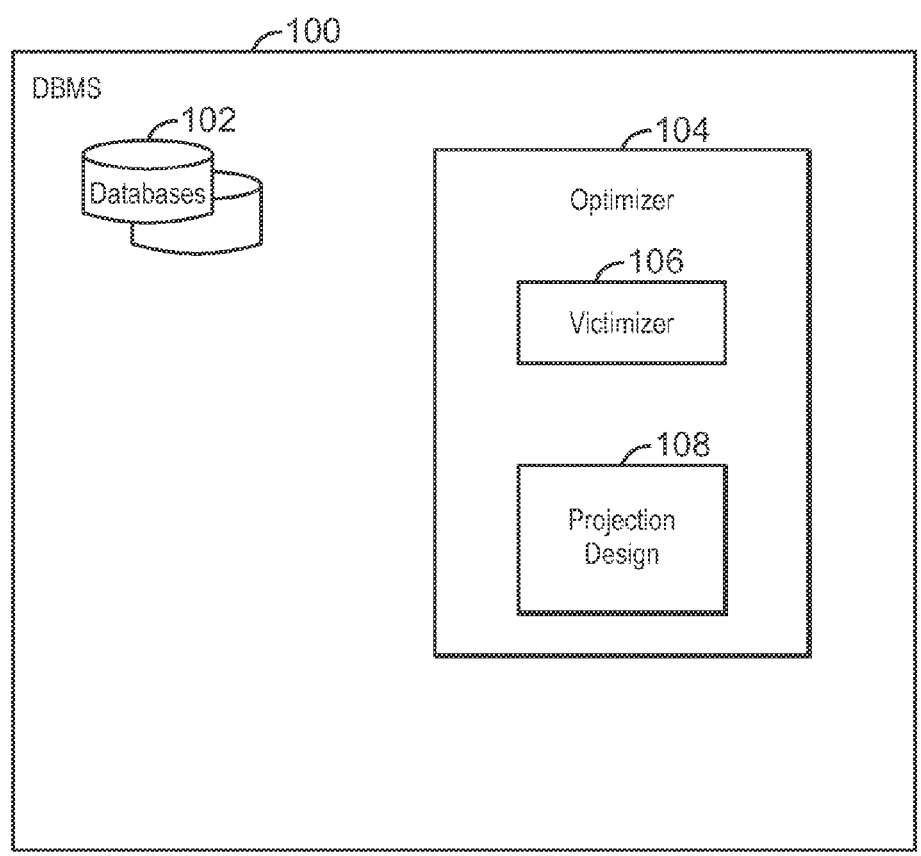
FIG. 1 is a block diagram of an example database management system (DBMS) that may be used to manage database nodes, in accordance with examples.

FIG. 1 is a block diagram of a DBMS 100 adapted to managing database nodes according to an example. The DBMS 100 includes computer programs that control the creation, maintenance, and use of databases 102 by an organization and its end users. The DBMS 100 include databases 102, an optimizer 104, and a victimizer 105. Queries are run against specific databases 102, which include data organized into tables, rows and columns, typical of a relational DBMS.

The optimizer 104 may be software that generates a query plan (not shown) for each query. The query plan describes the specific algorithms that process the query's data, and the locations where the data is located. Before queries are executed, the optimizer 104 identifies where specific data to be queried resides.

The optimizer 104 compiles each query just before execution. This enables the optimizer 104 to determine whether database nodes hosting specific data segments are down or not. As used herein, the term "down node" refers to a node that has failed or is in some way not operational. A data segment is a specific partition of data in a database 102. If the node hosting the data segment is down, the optimizer 104 attempts to replace references to the down node with a buddy node. The buddy node is a backup node that also hosts the data segment. The buddy node has the same data segment as the data segment on the down node. The data segment is segmented in the same way on each node and corresponding buddy node. It is noted that segment groups may also be used. A segment group includes multiple data segments.

In one example, the projections are segmented such that each node has one or more local segments. In this way, if there is a single down node, the victimizer 106 selects multiple victim nodes, with each doing just a little bit more work, instead of one victim node doing double duty for every segment on the failed node. For example, if each node has four local segments, four victims may be selected, where each node performs five segments worth of work.

A projection design 108 identifies the primary projection and the buddy projection for each data segment in a database table. A data segment of the primary projection is hosted on one node, and a copy of the data segment, belonging to a buddy projection, is hosted on another node. In the context of projections, the labels primary and buddy are relative to the query plan accessing the segments belonging to these projections. For example, for a given table t, the optimizer may choose a projection, p1, to be primary for some queries, and projection, p2, to be primary for other queries. For a given table, t, the optimizer 104 may choose a primary projection, p1, to be primary for some queries, and, in the event a of node failing that is hosting the segment belonging to p1, the optimizer 104 may choose the buddy projection, p2.

Figure 2:
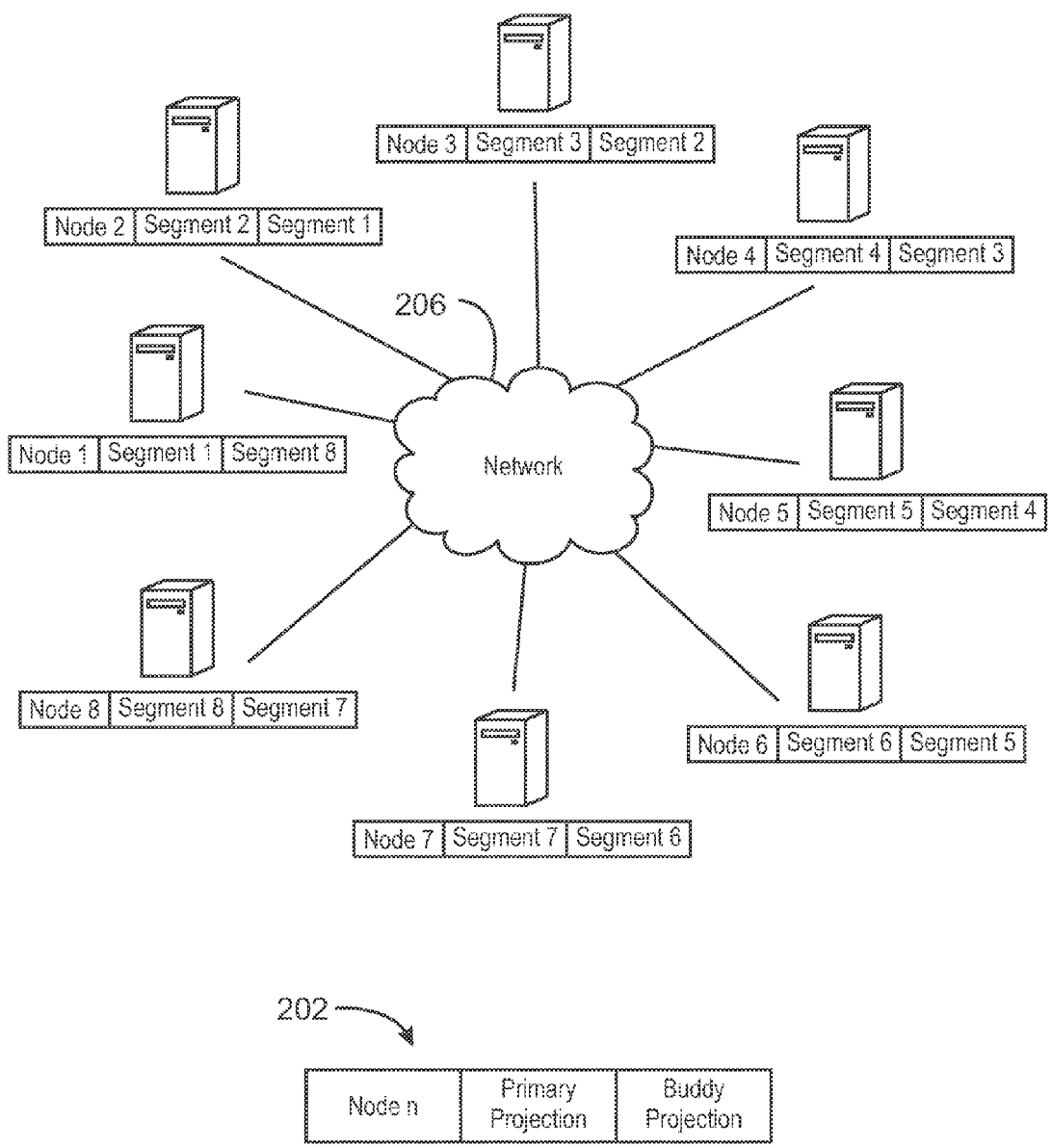
FIG. 2 is a block diagram of an example segmentation ring, in accordance with examples.

FIG. 2 is a block diagram of an example segmentation ring 200, in accordance with examples. The segmentation ring 200 is represented using a projection design 202. The projection design 202 represents data shown for each node 204. The ring 200 includes database nodes 204 in communication over network 206. Each node 204 specifies, according to the projection design 202, the node number, primary projection, and buddy projection. The segmentation ring 200 illustrates that, for example, Node 1 hosts the primary projection for data segment 1, and the buddy projection for data segment 8.

The optimizer 104 replaces the primary projection of a failed node 204 with the corresponding buddy projection on a buddy node. In one embodiment, if the buddy node is up, the victimizer 106 propagates the double duty responsibility to the next node 204 in the segmentation ring 200. For example, if node 5 is down, segment 5 is not available from the primary projection. As such, segment 5 is accessed from the buddy projection on node 6. Ordinarily, node 6 is selected to be the victim node. However, in an example, node 7 can become the victim by using the backup projection of segment 6 instead of the primary projection. This "passing of the buck" may be propagated around the ring until a down node is reached. In the example above, any node other than node 5 may be chosen as the victim node.

If there are many concurrent sessions, the victim node may be selected randomly among the remaining up nodes. As used herein, the term "up node" refers to a node that is operational. In this way, expected throughput on the cluster may be improved because a single buddy projection is chosen independently for each of the d down nodes. It is noted that FIG. 2 represents only one possible configuration of the segmentation ring, and various other configurations are possible.

In an example, managing database nodes in this way for node down failures, improves expected throughput such that, if there are m concurrent threads of execution, and the potential victim list for a down node is of length v, each node has m+ceiling (m/v) segments, on average, instead of 2 m segments as with typical approaches. If each of the database nodes 204 contains respectively similar amounts of data in each segment, performance improves by approximately a factor of 2 m/(m+m/v). For 1 node down, v is N−1 where N is total nodes in cluster. As such, a factor of 2 m/(m+(m/(N−1))) may be achieved, for N=40 and m=60 is 1.96. For 2 failed nodes down, the length of the shorter of the two lists is v=((m−d)/d)/2, and thus an improvement factor of 2 m/(m+(m/(((m−d)/d)/2)))=1.84 may be achieved. In general, a specific pattern of down nodes corresponds to a set of potential victim lists, and the expected performance improvement relative to previous approaches is a factor of 2 m/(m+ceiling(m/v)), where v is the length of the shortest potential victim list. This is a long term average that does not consider the effects of other factors, such as degraded performance of the buffer cache, improved performance due to better memory utilization, and less I/O contention, for example.

In an example, the victimizer 106 identifies the set of potential victim nodes 204 of the buddy path of the chosen buddy strategy. The nodes 204 include any sequence of up-nodes in the order of the segmentation-ring 200 of the buddy path, starting at the minimum-cost buddy node that satisfies a down node. This is the set of "potential victim nodes", since any node in this set may be chosen to perform double-duty. Each of the sub-sequences between adjacent down nodes on the segmentation ring 200 defines the sequence of potential victim nodes.

There are several advantages to selecting the double duty node randomly. More nodes are involved in doing extra work for the down node. Since work is randomly distributed among all up nodes, response time is faster than the previous approach where same node was doing extra work for all queries. Users running query concurrently increases throughput.

Figure 3:
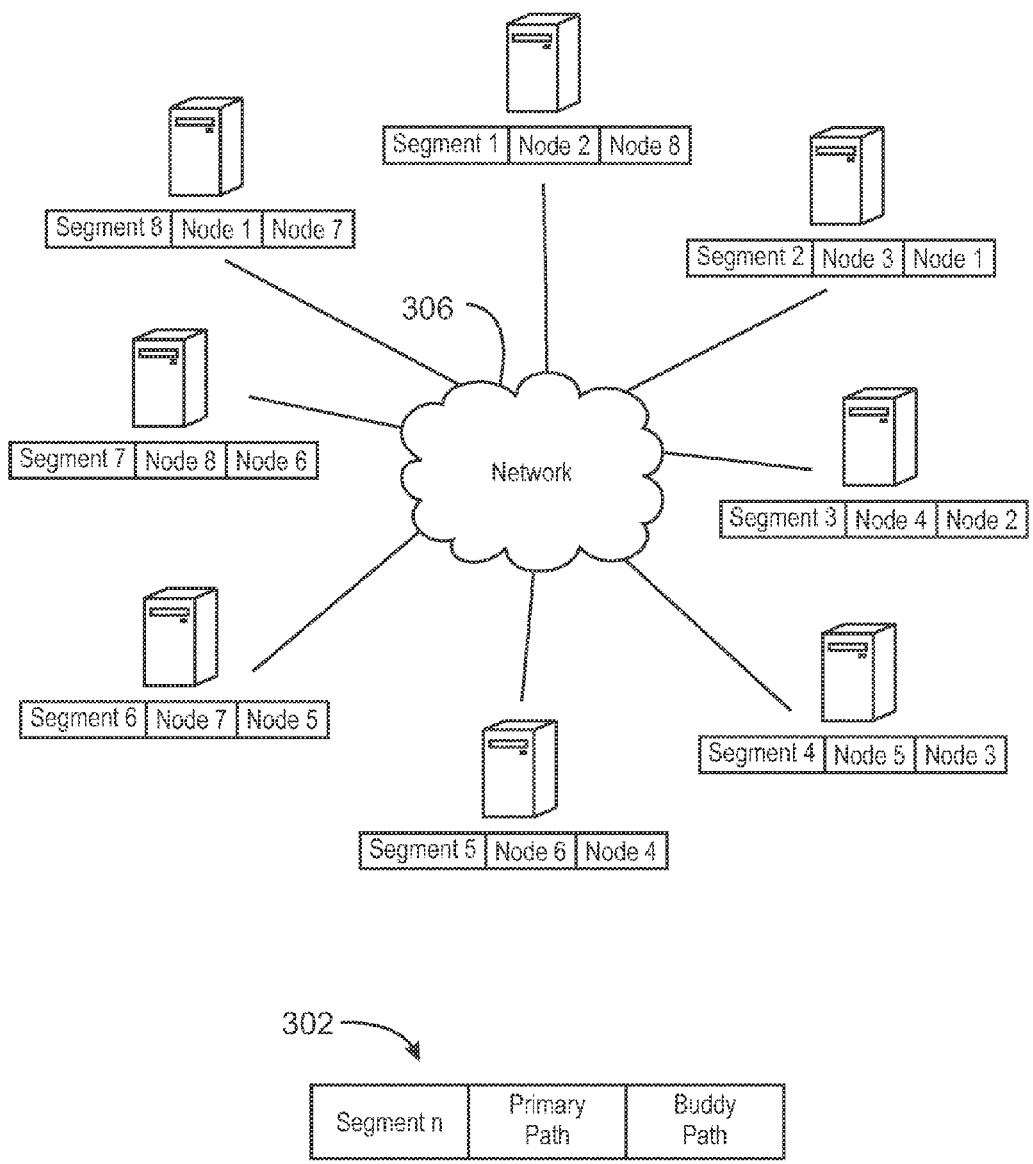
FIG. 3 is a block diagram of an example segmentation ring, in accordance with examples.

FIG. 3 is a block diagram of an example segmentation ring 300. In segmentation ring 300, the projection design 302 represents each data segment. The projection design 302 specifies the data segment number, primary path, and buddy path. The primary path specifies the node that hosts the primary projection for segment n. Similarly, the buddy path specifies the node that hosts the buddy projection for segment n. According to the segmentation ring 300, if node 4 is down, the primary projection of data segment 4 is unavailable. Thus, node 2 (hosting the buddy projection of segment 4) is used.

In an example, the victimizer 106 constructs a map, referred to herein as, primarySegment, that maps the primary projection node to the segment group number. The sequence of potential victim nodes starting from the segment of the down node on the primary projection, which is 4. The following sequence is applied, continuing up to, but not including, the next node that is either down or that appears in Pseudocode 1:

PSEUDOCODE 1 primaryNodeInactive.: while(!isNodeDown(curNode) && !primaryNodeInactive.find(curNode)) { potentialVictimNodesList.insert(curNode); curNode = buddyNode[curSegment]; /* n2 */ curSegment = primarySegment[curNode]; /* segment 1 */ }

The isNodeDown(N) function returns true if node N is up, otherwise false. The primaryNodeInactive.find(curNode) returns true if curNode is present in primaryNodeInactive list. The primaryNodeInactive list includes all the up nodes that are not accessing any data segments from the primary projection. Accordingly, the primaryNodeInactive list may include up nodes that are accessing data segments from the buddy projections instead. Once a list of potential Victim-NodesList is obtained, a victim node based on the random number may be chosen. The buddyNode( ) is a vector where the index represents the number of a data segment. buddyNode(index) represents the Node hosting segment number, "index."

Let the length of potentialVictimNodes be M. A uniformly distributed random integer m between 1 and M is generated, and includes the first m entries of potentialVictimNodes. In addition, the node at position 1 to (m−1) into primaryNodeInactive is inserted to designate that the primary projection is inactive on those nodes, as shown in Pseudocode 2. Once a list of primaryNodeInactive is obtained, the nodes may be marked as "NOT IN USE" for primary projection.

PSEUDOCODE 2

VictimNodeIndex = (__randomValue % potentialVictimNodes.size( ));
    priorNode = buddyNode;
    for (int i=0; i <=victimNodeIndex; i++)
    {
        currentNode = __potentialVictimNodes[i];
primaryNodeInactive.insert(priorNode);
priorNode = currentNode;
}

Figure 4:
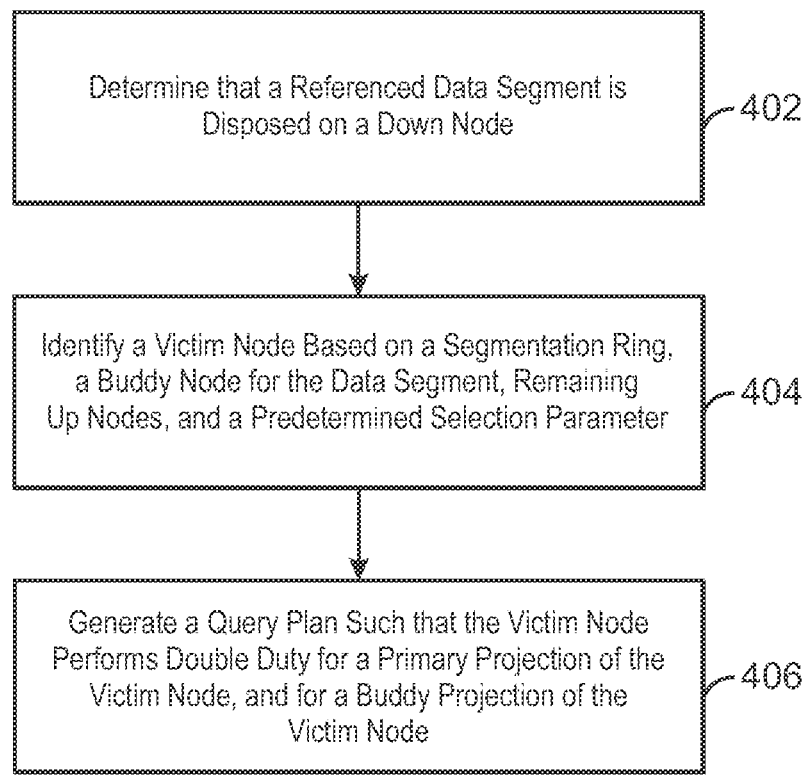
FIG. 4 is a process flow chart of an example method for managing database nodes, in accordance with examples.

FIG. 4 is a process flow chart of an example method 400 to manage database nodes, in accordance with examples. The method 400 begins at block 402, where the optimizer determines that the primary projection for a data segment being referenced by an operation of a query plan, is on a down node. As such, the query plan is generated such that the operation accesses the data segment from the buddy node for the data segment.

At block 404, a victim node is selected based on a segmentation ring, a buddy node for the data segment, the remaining up nodes, and a predetermined selection parameter. As stated previously, the predetermined selection parameter may be a round-robin technique, random selection, based on resource management, and so on.

At block 406, the query plan is generated such that the victim node performs double duty. If the query plan includes an operation accessing a data segment for a primary projection of the victim node, and an operation accessing a data segment for a buddy projection of the victim node, At block 406, the victim node performs double duty.

Figure 5:
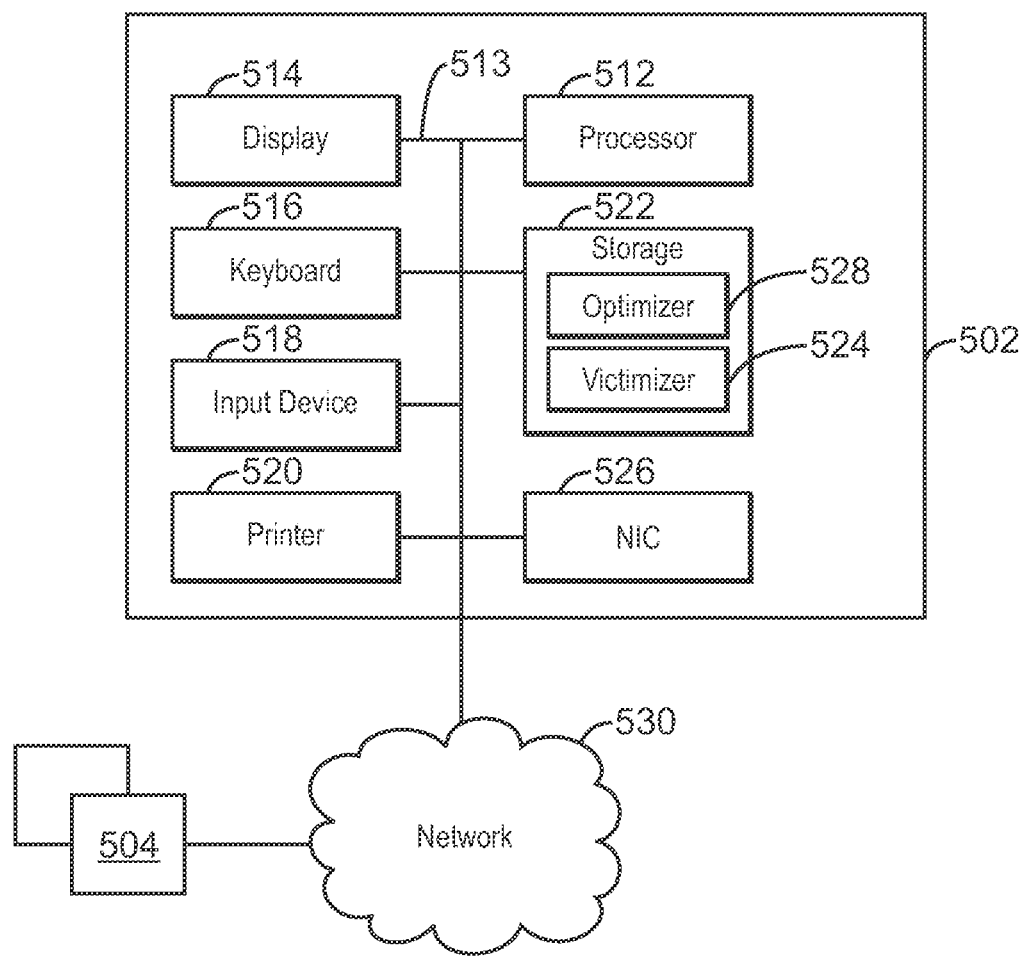
FIG. 5 is a block diagram of an example system that may be used to manage database nodes, in accordance with examples.

FIG. 5 is a block diagram of an example system 500 that may be used to manage database nodes, in accordance with embodiments. The functional blocks and devices shown in FIG. 5 may include hardware elements including circuitry, software elements including computer code stored on a tangible, non-transitory, machine-readable medium, or a combination of both hardware and software elements. Additionally, the functional blocks and devices of the system 500 are but one example of functional blocks and devices that may be implemented in examples. The system 500 can include any number of computing devices, such as cell phones, personal digital assistants (PDAs), computers, servers, laptop computers, or other computing devices.

The example system 500 can include a database node 502 having one or more processors 512 connected through a bus 513 to a display 514, a keyboard 516, and an input device 518, such as a mouse, touch screen, and so on. The database node 502 may also include tangible, computer-readable media for the storage of operating software and data, such as a hard drive or memory 522. The hard drive may include an array of hard drives, an optical drive, an array of optical drives, a flash drive, and the like. The memory 522 may be used for the storage of programs, data, and operating software, and may include, for example, the BIOS (not shown).

The memory 522 includes an optimizer 528 and a victimizer 524. The database node 502 can be connected through the bus 513 to a network interface card (NIC) 526. The NIC 526 can connect the database node 502 to a network 530. The network 530 may be a local area network (LAN), a wide area network (WAN), or another network configuration. The network 530 may include routers, switches, modems, or any other kind of interface devices used for interconnection. Further, the network 530 may include the Internet or a corporate network. The database node 502 may communicate over the network 530 with one or more remote computers 504. Through the network 530, several client computers 504 may connect to the database node 502. The client computers 504 may be similarly structured as the database node 502, with exception to the storage of the DBMS. In an exemplary embodiment, the client computers 504 may be used to submit the query to the database node 502 for optimization by the DBMS.

Figure 6:
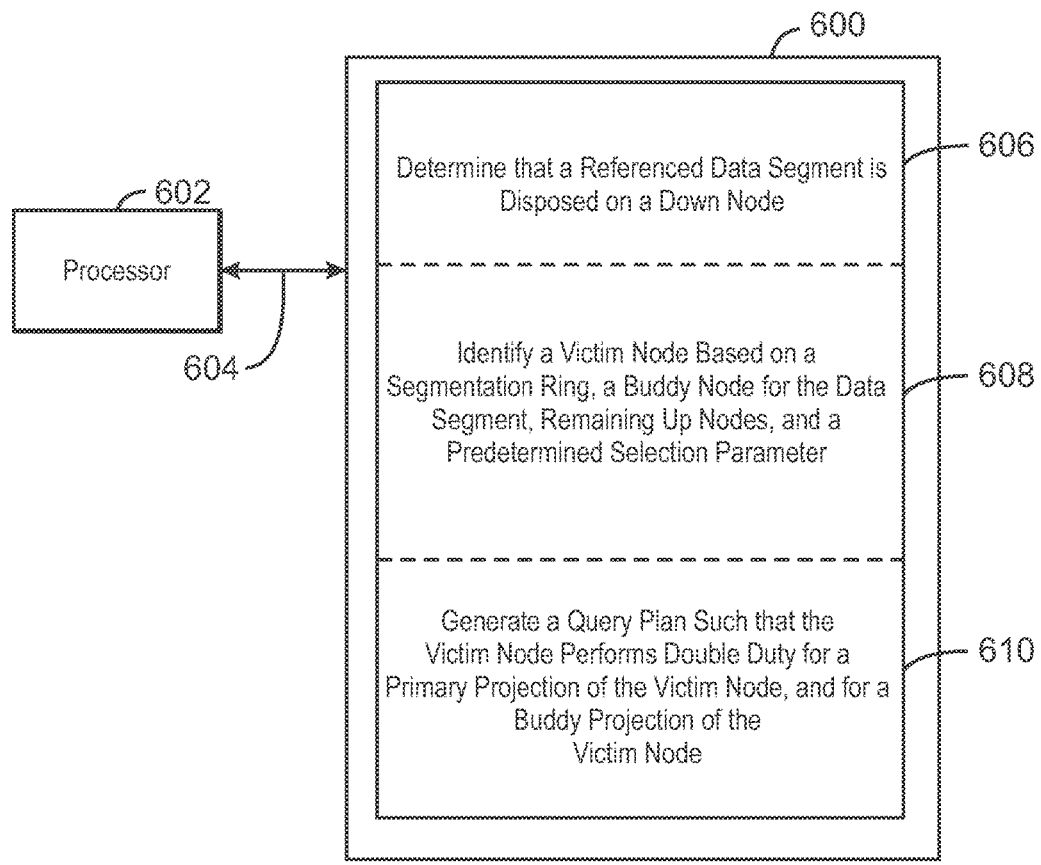
FIG. 6 is a block diagram showing an example tangible, non-transitory, machine-readable medium that stores code adapted to manage database nodes, in accordance with examples.

FIG. 6 is a block diagram showing an example tangible, non-transitory, machine-readable medium 600 that stores computer-implemented instructions adapted to manage database nodes. The machine-readable medium is generally referred to by the reference number 600. The machine-readable medium 600 may correspond to any typical storage device that stores computer-implemented instructions, such as programming code or the like. Moreover, the machine-readable medium 600 may be included in the storage 522 shown in FIG. 5. When read and executed by a processor 602, the instructions stored on the machine-readable medium 600 are adapted to cause the processor 602 to process instructions 606, 608, and 610 of the optimizer 528. The optimizer 528 determines that the primary projection for a data segment being referenced by an operation of a query plan, is on a down node. The optimizer 528 selects a victim node based on a segmentation ring, a buddy node for the data segment, the remaining up nodes, and a predetermined selection parameter. The optimizer 528 generates a query plan such that the victim node performs double duty.

What is claimed is:

1. A method for managing database nodes, the method comprising:

determining that a data segment is on a failed node in a segmentation ring, the data segment being referenced by an operation of a query plan;

replacing the failed node in the query plan with a buddy node for the data segment;

selecting a plurality of potential victim nodes that includes each node in the segmentation ring that is operational;

selecting a victim node from the plurality of potential victim nodes based on the buddy node for the data segment and a predetermined selection parameter; and generating a second query plan such that the victim node performs double duty for operations of a node in the segmentation ring.

2. The method of claim 1, comprising:

determining that a segment group is on the failed node, the segment group comprising a plurality of segments;

selecting a plurality of victim nodes based on the segmentation ring, buddy nodes hosting copies of the segments belonging to buddy projections, the plurality of remaining operational nodes, and the predetermined selection parameter; and generating a query plan such that the victim nodes perform double duty for operations accessing the segments from buddy projections on the victim nodes, and operations accessing data segments for primary projections of the victim nodes.

3. The method of claim 2, the segments comprising a segment group being hosted on a failed node, and the predetermined selection parameter comprising a workload balance for the victim nodes.

4. The method of claim 3, wherein the workload balance comprises work being performed at a time of failure for the failed node, and work being performed at the time of failure by the failed node for the segment group.

5. The method of claim 1, each of the database nodes comprising at least one segment of a projection.

6. The method of claim 1, the predetermined selection parameter being a round-robin selection.

7. The method of claim 1, the predetermined selection parameter being a random selection.

8. The method of claim 1, the predetermined selection parameter being based on resource parameters of the remaining operational nodes.

9. A system, comprising:

a plurality of database nodes; and a database node comprising:

a processor that is adapted to execute stored instructions; and a memory device that stores instructions, the memory device comprising:

computer-implemented instructions to determine that a plurality of segment groups are on a plurality of failed nodes in a segmentation ring, the segment groups comprising pluralities of segments;

computer-implemented instructions to replacing the plurality of failed nodes in with buddy nodes hosting copies of the segments;

computer-implemented instructions to select a plurality of potential victim nodes that includes each node in the segmentation ring that is operational;

computer-implemented instructions to select, for each segment group in the plurality of segment groups, a victim node from the plurality of potential victim nodes based on the buddy nodes and a predetermined selection parameter; and computer-implemented instructions to generate a query plan such that the victim nodes perform double duty for operations of a node in the segmentation ring.

10. The system of claim 9, the predetermined selection parameter comprising a workload balance for the victim nodes.

11. The system of claim 10, wherein the workload balance comprises work being performed by the victim nodes, at a time of failure for one of the failed nodes, and work being performed, at the time of failure for the one, by the failed nodes, for the segment groups.

12. The system of claim 9, each of the database nodes comprising at least one segment of a projection.

13. The system of claim 9, each of the database nodes comprising at least one segment group of a projection.

14. The system of claim 9, the predetermined selection parameter being a selected one of a round-robin selection, and a random selection, or being based on resource parameters of the remaining operational nodes.

15. A tangible, non-transitory, machine-readable medium that stores machine-readable instructions executable by a processor to manage database nodes, the tangible, non-transitory, machine-readable medium comprising:
    machine-readable instructions that, when executed by the processor, determine that a plurality of segment groups are on a plurality of failed nodes in a segmentation ring, the segment groups comprising pluralities of segments;
    machine-readable instructions that, when executed by the processor, replace the plurality of failed nodes in the segmentation ring with buddy nodes hosting copies of the segments belonging to buddy projections;
    machine-readable instructions that, when executed by the processor, select a plurality of potential victim nodes that includes each node in the segmentation ring that is operational;
    machine-readable instructions that, when executed by the processor, for each segment group in the plurality of segment groups, a victim node from the plurality of potential victim nodes based on buddy nodes hosting copies of the segments belonging to buddy projections and a predetermined selection parameter; and
    machine-readable instructions that, when executed by the processor, generate a query plan such that the victim nodes perform double duty for operations of a node in the segmentation ring.

16. The medium of claim 15, the predetermined selection parameter comprising a workload balance for the victim nodes.

17. The medium of claim 16, wherein the workload balance comprises work being performed by the victim nodes, at a time of failure for one of the failed nodes, and work being performed, at the time of failure for the one, by the failed nodes, for the segment groups.

18. The medium of claim 15, each of the database nodes comprising at least one segment of a projection.

19. The medium of claim 15, each of the database nodes comprising at least one segment group of a projection.

20. The method of claim 1, wherein the victim note is a node other than the buddy node.

* * * * *